United States Patent [19]

Weed

[11] 3,760,981
[45] Sept. 25, 1973

[54] BATCH METERING DEVICE FOR LIQUID DYES

[75] Inventor: William H. Weed, Syracuse, N.Y.

[73] Assignee: Allied Chemical Corporation, New York, N.Y.

[22] Filed: July 25, 1972

[21] Appl. No.: 275,013

[52] U.S. Cl............... 222/14, 222/23, 222/318, 222/380, 222/424.5, 222/443
[51] Int. Cl............................................. B67d 5/30
[58] Field of Search ................. 222/14, 23, 40, 70, 222/158, 159, 318, 333, 109, 380, 424.5, 424, 443; 141/244; 417/92, 12, 99; 137/565, 572

[56] References Cited
UNITED STATES PATENTS

| | | | |
|---|---|---|---|
| 3,430,812 | 3/1969 | Leo et al................................ | 222/14 |
| 3,038,639 | 6/1962 | Anderson............................... | 222/70 |
| 3,504,714 | 4/1970 | Bell........................................ | 222/318 X |
| 3,186,598 | 6/1965 | Johsson................................. | 222/67 X |
| 3,173,575 | 3/1965 | Gugerli et al........................ | 222/333 X |
| 1,729,200 | 9/1929 | Wood et al.......................... | 222/443 X |

Primary Examiner—Robert B. Reeves
Assistant Examiner—Joseph J. Rolla
Attorney—Jay P. Friedenson et al.

[57] ABSTRACT

A metering device for a liquid driven by a reversible pumping means which includes a storage means for holding the liquid and a measuring container above the storage means for measuring liquid which is to be delivered by the pumping means from the measuring container to a discharge means. The metering device includes a means for setting the volume of liquid which will be dispensed from the metering device. The volume setting means is preferably an arch in a conduit between the bottom of the measuring container and the storage means. The arch is below the top but above the bottom of the measuring container so that when the liquid level in the measuring container and in the conduit reaches the arch, additional liquid supplied to the measuring container and the conduit, will flow over the arch and return to the storage means. The pumping means operates to remove liquid from the storage means to the measuring container and conduit and, when reversed, operates to remove liquid from the measuring container and conduit to the discharge.

19 Claims, 1 Drawing Figure

PATENTED SEP 25 1973
3,760,981
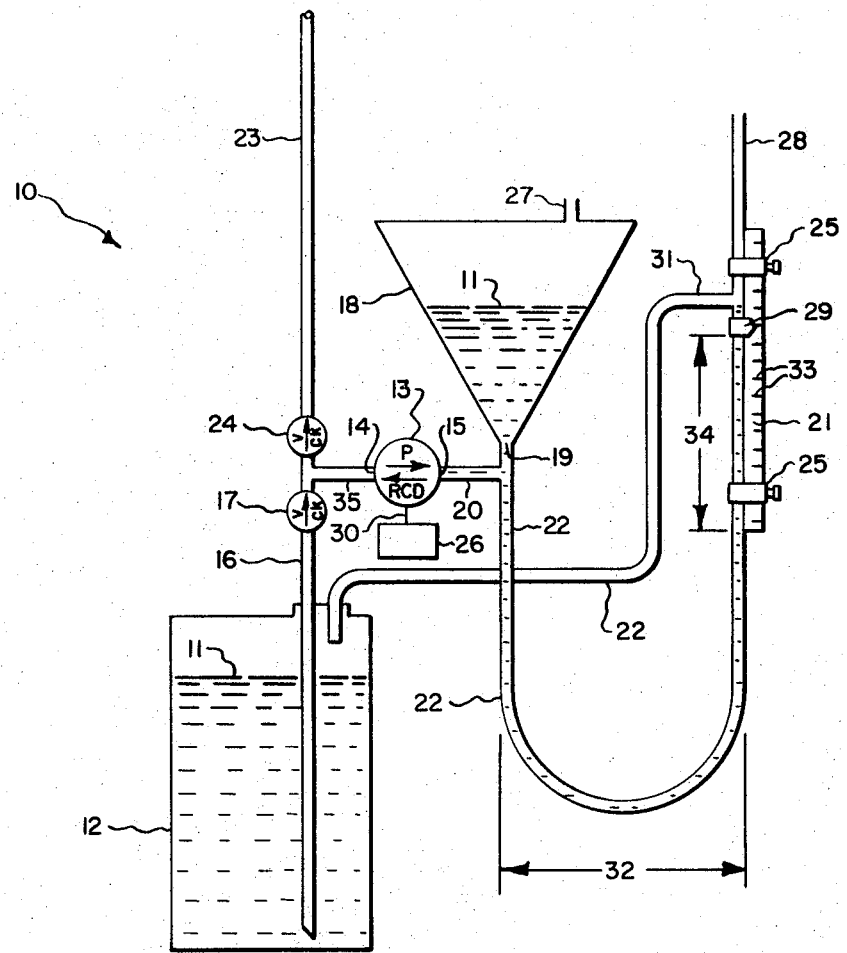

BATCH METERING DEVICE FOR LIQUID DYES

BACKGROUND OF THE INVENTION

This invention concerns a metering device and more particularly concerns an inexpensive batch metering device for delivering predetermined quantities of a liquid.

Prior art metering devices for automatically and accurately delivering predetermined quantities of liquids are complicated and expensive to manufacture or use. Inexpensive simple measuring devices which automatically and accurately deliver a predetermined quantity of liquid are unavailable. Inexpensive accurate metering devices are needed where accurate quantities of a liquid are to be delivered. Accurate quantities of liquid are needed for many purposes, for example in packaging uniform premeasured quantities of liquid, for accurately measuring a chemical reactant, or for accurately measuring a liquid such as a dye which is to be diluted with another measured quantity of another liquid such as water and applied to a textile substrate to obtain a predetermined textile color shade.

A simple inexpensive device for accurately automatically measuring and automatically delivering a predetermined quantity of liquid has now been described.

BRIEF DESCRIPTION OF THE DRAWING

The drawing shows a schematic diagram of the preferred embodiment of the metering device of the invention.

BRIEF DESCRIPTION OF THE INVENTION

The invention is for a metering device for a liquid which comprises a storage means, a reversible pumping means, a first conduit, a first check valve, a measuring container, a second conduit, a volume setting means, a third conduit means and a discharge means. The storage means holds liquid which is to be metered. The reversible pumping means is provided with inlet and discharge openings and the inlet opening is connected by the first conduit means to the storage means, the first conduit means being provided with a first check valve which permits liquid to flow from the storage means only toward the pumping means.

The measuring container has a lower opening which is connected by the second conduit means to the discharge opening of the pumping means. The lower opening is above the horizontal plane of the surface of the liquid in the storage means and is preferably above the horizontal plane passing through the top of the storage means. The volume setting means is adapted to set the volume of liquid which will be delivered from the metering device.

The third conduit means interconnects the lower opening of the measuring container with the storage means and at least a portion of the third conduit means extends above the horizontal plane of the lower opening of the measuring container. The third conduit is however entirely below the horizontal plane of the top of the measuring container.

The discharge means, which may consist only of an orifice but is preferably a conduit including a second valve, is connected to the inlet opening of the pumping means. In operation liquid from the storage means is drawn by the reversible pumping means through the first conduit to the inlet opening of the pumping means and through the pumping means and second conduit means into the measuring container and third conduit means. When the liquid reaches the level determined by the volume setting means which may be an arch in the third conduit means, the reversible pumping means is then reversed thereby dispensing liquid in the measuring container and third conduit through the discharge means.

DETAILED DESCRIPTION OF THE INVENTION

The metering device of this invention comprises a storage means, such as a drum or other reservoir for holding the liquid to be measured. The storage means may, if desired be the container in which the liquid was originally delivered, thus eliminating the need for transfer of the liquid to a special storage reservoir. The metering device is driven by a reversible pumping means, preferably in conjunction with a reversing switch actuated by a timing means. The reversible pumping means may be a reversible centrifugal, piston or diaphragm pump or any other reversible pumping means known in the art. The pump may be actuated and reversed by a hand operated switch or, preferably, may be operated by a reversing switch actuated by a timing means such as a gear or electronic timer. The reversible pumping means is provided with inlet and discharge openings which may also be referred to as first and second openings respectively. The inlet opening is connected by a first conduit means such as a pipe, hose or tube manufactured from metallic, ceramic or plastic materials to the storage means. The first conduit means is provided with a first check valve of any suitable design which permits liquid to flow from the storage means only toward the pumping means. The first check valve prevents liquid from returning through the first conduit means to the storage means.

The metering device is provided with a measuring container having a lower opening. The measuring container is of any suitable regular shape and may for example be cylindrical, spherical, pyramidal or prismic. A particularly advantageous shape is an inverted cone in that all contained liquid is is funneled to a single location at the bottom of the measuring container and in that it has been found that the percentage of error with respect to volume seems to be more constant than is the case when a measuring container having a constant cross sectional area such as a cylinder is used where the error is a constant volume rather than a constant percentage.

The measuring container may be manufactured from any suitable substance such as metallic, ceramic, or plastic materials or may be of laminated construction. A lower opening is provided in the measuring container which is preferably provided with a Y or T type fiitting to permit connection of a pair of conduit means. The lower opening is connected by means of the fitting to one end of a second conduit means which may be of a construction similar to the construction of the first conduit means. The other end of the second conduit means is connected to the discharge opening of the pumping means.

The measuring device is provided with a volume setting means which is capable of setting the volume of liquid which will be delivered from the metering device. The volume setting means may be fixed or adjustable. The volume setting means preferably comprises an arch in a third conduit between the lower opening of the measuring means and the storage means, the upper portion of the arch being at a vertical height above a horizontal plane passing through the lower opening of the measuring container and below a horizontal plane passing through the top of the measuring container. With this arrangement, liquid being forced by the pumping means into the measuring reservoir and the third conduit will fill both the reservoir and the third conduit until the liquid level reaches the arch. After the liquid level reaches the arch the level will not rise further since additional liquid will flow over the arch and back to the storage means. The vertical height of the arch is preferably adjustable by raising and lowering the arch between a horizontal plane passing through the lower opening of the measuring container and a horizontal plane passing through the top of the measuring container. The liquid level which can be reached in the third conduit is thus adjustable, which in turn varies the volume of liquid which can be held by the measuring container and third conduit. The arch is then held in place by a holding means such as an adjustable clamp. The arch is preferably flexible in order to permit raising and lowering, although other means such as a sleeve fitting in the third conduit may be used to permit the vertical height of the arch to be adjusted. The measuring device does not require an adjustable volume setting means if the volume to be delivered by the metering device does not need to be adjusted, that is where only a fixed predetermined unadjustable volume is to be delivered by the metering device. Fixing the vertical height of the arch as described above in a predetermined unadjustable position will result in a metering device which will deliver a constant unadjustable volume of liquid. When the arch is in a fixed position the third conduit may be made entirely from flexible materials such as rubber or flexible plastic, or entirely from rigid materials such as steel.

The third conduit connecting the lower opening of the measuring container with the storage means may be rigid if a constant unadjustable volume is to be delivered from the metering device or if a volume setting means other than the simple arch arrangement of the preferred embodiment is used, if the volume to be delivered is to be adjustable by moving the arch, the third conduit should preferably be at least partially flexible to permit movement of the arch in at least a partially vertical direction.

The metering device may be provided with a discharge means connected to the inlet opening of the pumping means. The discharge means may be of a simple orifice or a fourth conduit to carry the measured liquid, to a predetermined area. The discharge means preferably but not necessarily includes a second check valve to prevent liquid or air from being pulled through the discharge means into the pumping means when the pumping means is being operated in a direction to fill the measuring container. The second check valve permits liquid to flow only in a direction away from the pumping means through the discharge means.

The metering device of the invention may, if desired, be provided with a volume measuring means for determining the volume of liquid at any time which may be pumped by the pumping means through the discharge means. The volume measuring means may be any suitable apparatus for directly or indirectly determining the volume of liquid in the measuring container and third conduit, available for transmission by the pumping means through the discharge means.

In the preferred embodiment the volume measuring means is a height measuring means for measuring the vertical depth of the liquid in the measuring container, which depth measurement can be easily converted to a volume measurement mathematically due to the regular shape of the container. For example, if the measuring container is a vertically oriented inverted cone wherein the radius of the cone at any given position is one-half the depth or distance $h$ to the vertex from that position, the volume would be $$(\pi (\tfrac{1}{2}h)^2 h/3) \text{ or } (\tfrac{1}{4}h^3\pi/3) \text{ or } 1/12 h^3\pi$$

To this volume must be added the volume of liquid in the third conduit which, if the third conduit is an elongated cylinder which is vertically oriented from the horizontal plane of the lower opening, can be calculated by the formula $+ \pi r^2 h$ where $h$ is the vertical height of liquid in the third conduit from the horizontal plane of the lower opening which is the same as the depth of liquid in the measuring container, since the liquid seeks its own level. Since $\pi$ and $r$ are constants, it is clear that volume is solely dependent upon vertical height of liquid in the measuring container, thus a simple scale may be devised indicating volume directly from the vertical height measurement. "Horizontal plane of the lower opening" means that horizontal plane through the lower most portion of an opening in either the measuring container or second conduit through which liquid will pass by gravitational force. It is assumed in these calculations that both the measuring container and upper arch of the third conduit are vented to prevent the pumping means from pulling liquid either from a lower arch of the third conduit between th the lower opening and another position on the horizontal plane of the lower opening, or through the third conduit from the storage means.

In the preferred embodiment, the height measuring means is a pressure gauge attached to the lower opening or comprises the third conduit manufactured of transparent material, a portion of which runs parallel and proximate to a scale. The scale extends at least partially in a direction parallel to the vertical axis of the measuring reservoir above the horizontal plane passing through the lower opening of the measuring container so that the liquid level may be seen through the transparent material next to the scale. The scale may be calibrated to read vertical height or preferably may be calibrated to read volume directly.

The metering device may be started, stopped and reversed by a hand operated switch activating and reversing the pumping means; however, the pumping means is preferably started, stopped and reversed in a predetermined sequence by a switch operated by a timing means. The timing means may be any suitable timing device for activating the switch such as an electronic timer or an electric motor operating a sequence of gears.

In operation activation of the pumping means in a forward direction causes liquid to flow from the storage means and the first check valve to the inlet opening of the pumping means. The liquid then flows through the pumping means through the second conduit means into the measuring container and into the third conduit means. The liquid then fills the measuring container and the third conduit means until the liquid reaches the volume set by the volume setting means. When the volume setting means is the previously discussed upper arch in the third conduit means, liquid in excess of the predetermined volume flows over the upper arch in the third conduit means. Reversing the pumping causes liquid in the measuring container and in the third conduit means to flow through the second conduit means through the pumping means and the second check valve to the discharge means.

The operation of a preferred embodiment of the batch metering device can be further illustrated by reference to the drawing. Metering device 10 comprises storage means or storage reservoir 12 which may be a drum for holding liquid 11. A reversible centrifugal pump 13 having inlet or first opening 14 and discharge or second opening 15, is connected by means of pipe or first conduit means 16 and common conduit 35 to drum 12. Pipe 16 is connected to inlet opening 14 of pump 13 and is provided with check valve 17 which prevents liquid from flowing from the pump 13 to drum 12. Pump 13 is connected by means of second conduit or pipe 20 to lower opening 19 of measuring container 18 adapted to hold liquid 11. Lower opening 19 is connected by means of third conduit 22, preferably in the form of a transparent tube, to drum 12, lower opening 19 being at a higher level than the liquid in drum 12 and preferably above the horizontal plane passing through the top of drum 12 with a portion 34 of tube 22 running parallel to a proximate scale 21.

A discharge means in the form of pipe 23 is connected by means of common conduit 35 to inlet opeing 14 of pump 13 and is provided with a second check valve 24 which prevents liquid or air from flowing through pipe 23 to pump 13. The discharge means delivers the measured quantity of liquid to its desired location for example if the liquid is a dye, to a diluting tank (not shown) from which the diluted dye may be used to dye a textile fabric.

The volume setting means comprises an upper arch 31 in tube 22 and a pointer 29 secured to tube 22 proximate the arch 31 at the position in tube 22 where liquid will begin to flow by gravity over arch 31, which is the uppermost upwardly curved portion of tube 22, when section 34 of tube 22 is filled with liquid, section 34 being a section of tube 22 below arch 31 connected to lower opening 19.

A part of section 34 is preferably secured to scale 21 by a fastening means such as clamps 35 although in other embodiments other sections of tube 22 or none of tube 22 may be connected to scale 21. Scale 21 is provided with volumetric markings 33 to indicate the volume of liquid in tube 22 and measuring container 18. Vents 27 and 28 are supplied on measuring container 18 and arch 31 respectively to ensure smooth flow throughout the system and to prevent liquid from being drawn from lower arch 32 which is the lower most downwardly curved portion, of tube 22 by pump 13 when the liquid level in tube 22 falls below the level of lower opening 19.

Pump 13 is activated, stopped and reversed by a timing and switch means in the form of motor driven geared timer switch 26 which is connected to pump 13 by means of cable 30. The sequence of timer switch 26 is preferably such that pump 13 is stopped before it is reversed to permit turbulence in liquid 11 to subside so that liquid 11 in measuring container 18 and tube 22 will more accurately reach its proper level thus permitting improved metering accuracy.

In operation timer switch 26 actuates pump 13 in the forward direction which causes liquid 11 to be drawn from drum 12 through pipe 16 check valve 17 and common conduit 35 to pump 13. Pump 13 then pumps liquid 11 through pipe 20 into measuring container 18 and tube 22. When the liquid level in container 18 and tube 22 reaches upper arch 31 additional liquid flows over upper arch 31 through tube 22 to drum 12. Timer switch 26 then stops pump 13 for a sufficient period to permit stabilization of the liquid level in measuring container 18 and tube 22. Timer switch 26 then reverses pump 13 causing liquid stored in measuring container 18 and tube 22 to pass through pump 13 and check valve 24 to discharge pipe 23 until the liquid level in measuring container 18 and tube 22 is below the level of lower opening 19. Check valve 16 prevents liquid from passing from pump 13 to drum 12 when the pump is reversed. Timer switch 26 will then stop pump 13 and start it again in the forward direction to repeat the measuring cycle. The timer switch may start, stop, and reverse the pump in a predetermined sequence which may be repeated in a continuous operation.

The liquid level in measuring container 18 and tube 22 can be observed through tube 22 and the volume of liquid in container 18 and tube 22 can be read on scale 21 at the liquid level line. This is not possible when section 34 of tube 22 is not proximate scale 21, although except for reading liquid level, the metering device will still operate if other sections or no sections of tube 22 is proximate scale 21. Arch 31 should, however, be proximate scale 21 to permit the volume to be delivered to be easily determined on the scale at the position of loop 31.

The volume of liquid being delivered by the metering device can be changed by releasing clamps 25 and raising or lowering arch 31 in tube 22 thus raising or lowering the liquid level reached before addition liquid passes over arch 31 to drum 12. The volume to be delivered can be read on scale 21 at pointer 29.

Volumetric reproducible accuracy of the metering device as shown in the drawing is about ± 1.0 percent based on the volume of liquid delivered. Much higher accuracy can however be obtained when the upper arch is horizontal with a narrow neck on a different shaped measuring container. Accuracies can be as good as ± 0.01 percent when a narrow necked measuring container is used; however, such accurate volume measurements may be made only over a relatively small volumetric range which range is equal to the volume of the narrowed neck. For example if the measuring container holds 1,000 cubic cm. up to the neck and the neck holds five cubic centimeters, the very accurate volume measurements may be made only between 1,000 and 1,005 cubic centimeters.

In order to assist in preventing liquid from flowing through the third conduit means or through the pumping means to discharge means when the pumping means is reversed, the third conduit means preferably enters the storage means proximate the top of the storage means so that the third conduit means will not be immersed in liquid held in the storage means. The first conduit however is to be maintained within the liquid in the storage means so that liquid will enter the first conduit to provide liquid to the pumping means. The first conduit therefore enters the bottom of the storage means or enters the top of the storage means and terminates or stops proximate the bottom of the storage means.

I claim:
1. A metering device for a liquid comprising;
   a. a storage means for said liquid;
   b. a reversible pumping means having inlet and discharge openings said inlet opening being connected by;
   c. a first conduit means to the storage means, the first conduit means being provided with;
   d. a first check valve which permits liquid to flow from the storage means only toward the pumping means;
   e. a measuring container having a lower opening, said lower opening being connected by
   f. a second conduit means to the discharge opening of the pumping means, said lower opening being above the horizontal plane of the surface of the liquid in said storage means;
   g. a volume setting means adapted to set the volume of said liquid which will be delivered from said metering device;
   h. a third conduit means interconnecting the lower opening of the measuring container with the storage means, a portion of said third conduit means extending above the horizontal plane of said lower opening, said third conduit means being entirely below the horizontal plane of the top of said measuring container; and
   i. a discharge means connected to the inlet opening of said pumping means.

2. The metering device claimed in claim 1 wherein the volume setting means comprises an arch in the third conduit means, the upper portion of the arch being at a vertical height above a horizontal plane passing through the lower opening of the measuring container and below a horizontal plane passing through the top of the measuring container.

3. The metering device of claim 2 wherein the vertical height of the arch is adjustable between a horizontal plane passing through said lower opening and a horizontal plane passing through the top of said measuring container.

4. The metering device of claim 3 wherein said third conduit is manufactured at least partially from a flexible material so that the arch may be vertically moved.

5. The metering device claimed in claim 2 wherein there is provided a volume measuring means for determining the volume of liquid at any time which may be pumped by said pumping means through said discharge means.

6. The metering device claimed in claim 5 wherein said volume measuring means comprises a height measuring means proximate said measuring container, said height measuring means being capable of measuring the vertical depth of said liquid in said measuring container.

7. The metering device claimed in claim 6 wherein said height measuring means is a pressure gauge attached to said lower opening.

8. The metering device claimed in claim 6 wherein the height measuring means comprises the third conduit manufactured of transparent material, a portion of said third conduit running parallel and proximate to a scale, said scale extending at least partially in a direction parallel to the vertical axis of the measuring container above a horizontal plane passing through the lower opening of the measuring so that the liquid level may be seen through the transparent material next to the scale.

9. The metering device of claim 1 wherein the discharge means includes a second check valve which permits liquid to flow only in a direction away from the pumping means through the discharge means.

10. A metering device as claimed in claim 9 wherein said pumping means is automatically started, stopped and reversed in a predetermined sequence by a switch operated by a timing means.

11. The metering device of claim 9 wherein the timing means is an electric motor operating a sequence of gears.

12. The metering device of claim 9 wherein said measuring container is a cone in shape and the lower opening is at the apex of the cone being the lower most portion of said measuring container.

13. The metering device of claim 10 wherein said first conduit enters the storage means and terminates proximate the bottom of the storage means.

14. The metering device of claim 1 wherein the first conduit is attached to the storage means proximate the bottom of the storage means.

15. The metering device of claim 4 wherein the flexible third conduit means enters the storage means proximate the top of the storage means and stops proximate the top of the storage means.

16. The metering device of claim 15 wherein the top of the measuring container is provided with a vent opening.

17. The metering device of claim 10 wherein said sequence is continuous.

18. The metering device of claim 4 wherein said flexible third conduit is provided with an upwardly extending vent line open to the atmosphere said vent line being connected to said flexible third conduit at the upper most portion of said flexible third conduit.

19. The metering device of claim 18 wherein said flexible third conduit is provided with a pointer indicating means proximate the intersection of said flexible third conduit with said vent line.

* * * * *